United States Patent
Qin et al.

(10) Patent No.: US 10,141,797 B2
(45) Date of Patent: Nov. 27, 2018

(54) ELECTRIC MOTOR HAVING A POLYGON STATOR

(71) Applicant: Johnson Electric S.A., Murten (CH)

(72) Inventors: Rui Feng Qin, Hong Kong (CN); Fei Liu, Shenzhen (CN); Hong Liang Zhang, Shenzhen (CN); Jiang Cheng Xiao, Shenzhen (CN); Hai Qiang Zhou, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 453 days.

(21) Appl. No.: 14/670,980

(22) Filed: Mar. 27, 2015

(65) Prior Publication Data
US 2015/0280497 A1    Oct. 1, 2015

(30) Foreign Application Priority Data
Mar. 28, 2014 (CN) .......................... 2014 1 0124308

(51) Int. Cl.
*H02K 1/16* (2006.01)
*H02K 1/26* (2006.01)

(52) U.S. Cl.
CPC .............. *H02K 1/165* (2013.01); *H02K 1/16* (2013.01); *H02K 1/265* (2013.01)

(58) Field of Classification Search
CPC ........... H02K 1/16; H02K 1/165; H02K 1/265
USPC ........... 310/187, 216.055, 216.069, 216.071, 310/216.072, 216.073, 216.133
See application file for complete search history.

(56) References Cited

U.S. PATENT DOCUMENTS

| | | | | |
|---|---|---|---|---|
| 3,417,272 A * | 12/1968 | Hoy | .......................... | H02K 1/30 310/216.011 |
| 4,363,987 A * | 12/1982 | Vorotyntseva | ......... | H02K 1/148 310/216.046 |
| 5,998,904 A * | 12/1999 | Hattori | ................... | H02K 1/165 310/156.19 |
| 6,597,080 B2 * | 7/2003 | Soderberg | .............. | H02K 23/22 29/596 |
| 8,618,711 B2 * | 12/2013 | Shirai | .................... | H02K 1/165 310/216.001 |
| 2003/0042814 A1* | 3/2003 | Tagome | ................. | H02K 1/246 310/156.08 |

(Continued)

FOREIGN PATENT DOCUMENTS

CN    202651906 U    1/2013
CN    103001345 A    3/2013

(Continued)

*Primary Examiner* — Bernard Rojas
*Assistant Examiner* — Rashad Johnson
(74) *Attorney, Agent, or Firm* — Muncy, Geissler, Olds & Lowe, P.C.

(57) ABSTRACT

An electric motor has a polygon stator core. The polygon stator core includes yoke portions and teeth extending inwardly from the yoke portions. A winding slot is formed between adjacent teeth. Adjacent yoke portions are interconnected by a connecting portion. The winding slots include first winding slots and second winding slots of different shapes. The ratio of the area of a first winding slot to the area of a second winding slot is greater than or equal to 0.9 but less than or equal to 1.1. By changing the shape of the stator core, the size of the winding slots may be increased without increasing the radial dimension of the motor.

10 Claims, 7 Drawing Sheets

(56) References Cited

U.S. PATENT DOCUMENTS

| | | | | |
|---|---|---|---|---|
| 2004/0061408 A1* | 4/2004 | Grant | ............... | H02K 1/16 |
| | | | | 310/216.016 |
| 2004/0130232 A1* | 7/2004 | Chang | ............... | H02K 1/165 |
| | | | | 310/216.074 |
| 2007/0132332 A1* | 6/2007 | Shim | ............... | H02K 17/08 |
| | | | | 310/184 |
| 2009/0108699 A1* | 4/2009 | Li | ............... | H02K 1/148 |
| | | | | 310/216.009 |
| 2009/0134738 A1* | 5/2009 | Yoshikawa | ............... | H02K 1/146 |
| | | | | 310/216.004 |
| 2014/0346904 A1* | 11/2014 | Yoon | ............... | H02K 1/02 |
| | | | | 310/46 |

FOREIGN PATENT DOCUMENTS

| JP | 2001-204165 A | 7/2001 |
|---|---|---|
| JP | 2007-159262 A | 6/2007 |

* cited by examiner

ELECTRIC MOTOR HAVING A POLYGON STATOR

CROSS REFERENCE TO RELATED APPLICATIONS

This non-provisional patent application claims priority under 35 U.S.C. § 119(a) from Patent Application No. 201410124308.7 filed in The People's Republic of China on Mar. 28, 2014, the entire contents of which are hereby incorporated by reference.

FIELD OF THE INVENTION

This invention relates to an electric motor and in particular, to an electric motor having a polygon stator.

BACKGROUND OF THE INVENTION

A brushless direct current (BLDC) motor has a stator and a rotor. The stator has a stator core with a winding wound thereon. An electric current flowing through the winding generates a magnetic field. An electromagnetic force is generated by the energized conductor cutting magnetic flux lines, which causes the rotor to rotate with respect to the stator, whereby the electrical energy is converted into kinetic energy. The stator core is usually formed by a stack of core laminations. As the BLDC motor is becoming widely used, there is a demand for the motor to have higher performance including smaller size and greater output power. The size of the stator is mainly determined by the size of the stator core.

Figure 1:
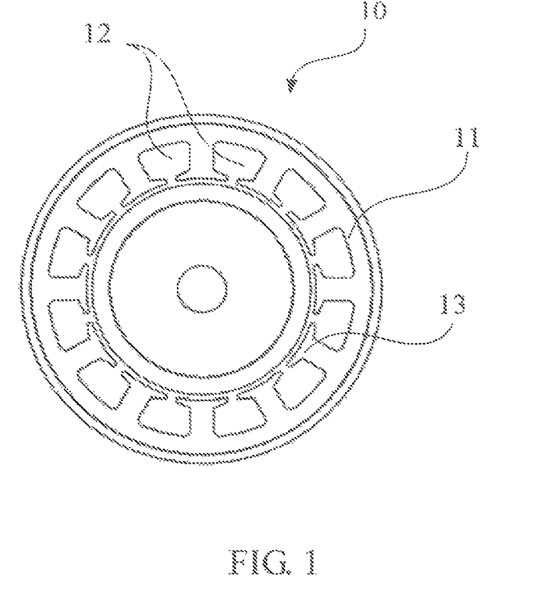
FIG. 1 illustrates a conventional stator core.

As shown in FIG. 1, an electric motor 10 with a conventional stator core 11 has a generally round annular shape, which has an inner circumferential surface with a plurality of teeth 13 formed thereon. A winding slot 12 is formed between adjacent teeth, and all the winding slots 12 have the same shape. While a stator core with such a configuration is easy to fabricate, it is difficult to further increase its output power, due to a lack of space to increase the size of the winding slots.

SUMMARY OF THE INVENTION

Hence there is a desire for an electric motor having an improved stator configuration.

Accordingly, in one aspect thereof, the present invention provides an electric motor comprising a stator having a polygon stator core and a rotor rotatable relative to the stator and having a plurality of magnetic poles, wherein the polygon stator core comprises: a plurality of yoke portions and connecting portions interconnecting adjacent yoke portions to form a polygon; a plurality of teeth extending inwardly from the yoke portions, winding slots respectively formed between adjacent teeth, the winding slots comprising a plurality of first winding slots and a plurality of second winding slots, the first winding slots and the second winding slots have different shapes, and the ratio of the area of one of the first winding slots to the area of one of the second winding slots is greater than or equal to 0.9 but less than or equal to 1.1.

Preferably, a plurality of the second winding slots is disposed between two adjacent first winding slots.

Preferably, the yoke portions of the stator core are connected to form one of a quadrilateral, a square and a hexagon.

Preferably, each yoke portion of the stator core is straight or arc-shaped.

Preferably, the number of the winding slots is an integral multiple of three.

Preferably, the shape of the winding slot is one of a triangle, rectangle, rhombus and trapezoid.

Preferably, the connecting portion is one of arcuate, straight and kinked in shape.

Preferably, the yoke portions of the stator core are connected to form a quadrilateral, and six or twelve teeth are formed along an inner circumferential surface of the stator core.

Preferably, the plurality of the first winding slots have a first shape, and the plurality of the second winding slots have a second shape, different from the first shape.

Preferably, the ratio of the number of the magnetic poles to the number of the teeth is 2:3.

In view of the foregoing, by changing the shape of the stator core, the size of the stator core is increased in the limited space within the motor. In addition, with the winding slots having different shapes but having approximately the same area (the area difference is within 10%), the area utilization rate and hence the output power can be increased.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 2:
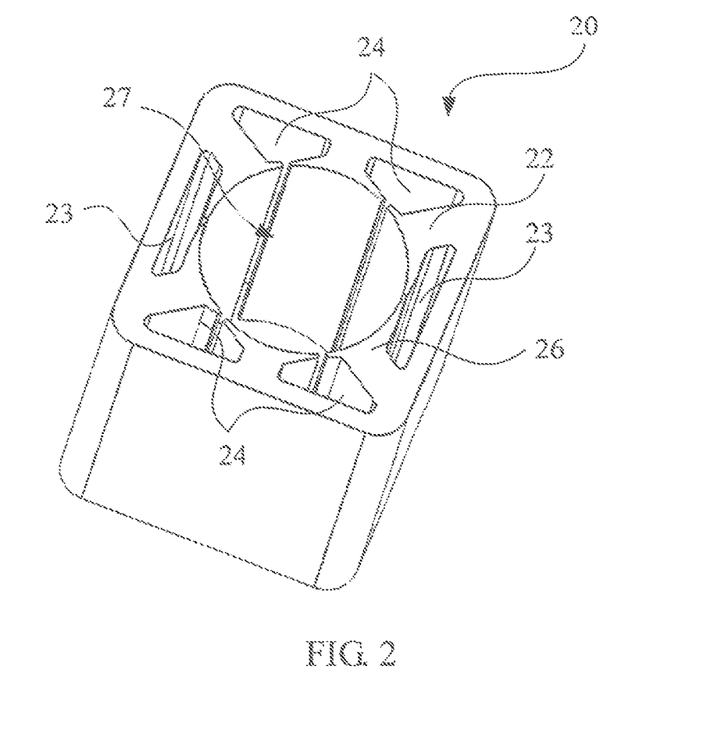
FIG. 2 illustrates a stator core according to a first embodiment of the present invention.
Figure 3:
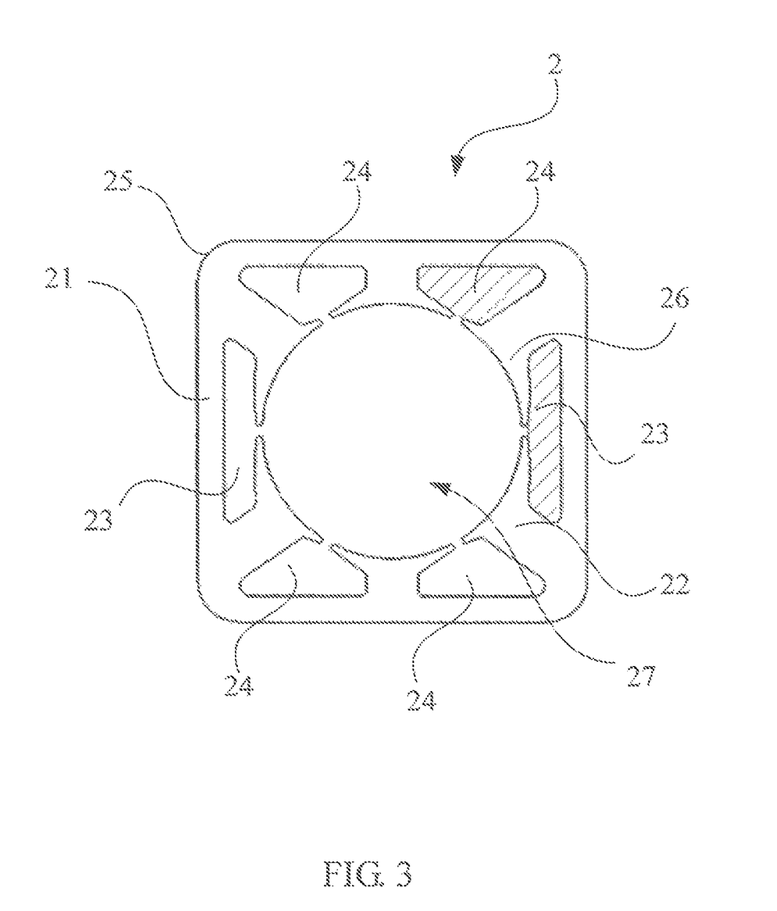
FIG. 3 illustrates a stator core lamination of the stator core of FIG. 2.
Figure 4:
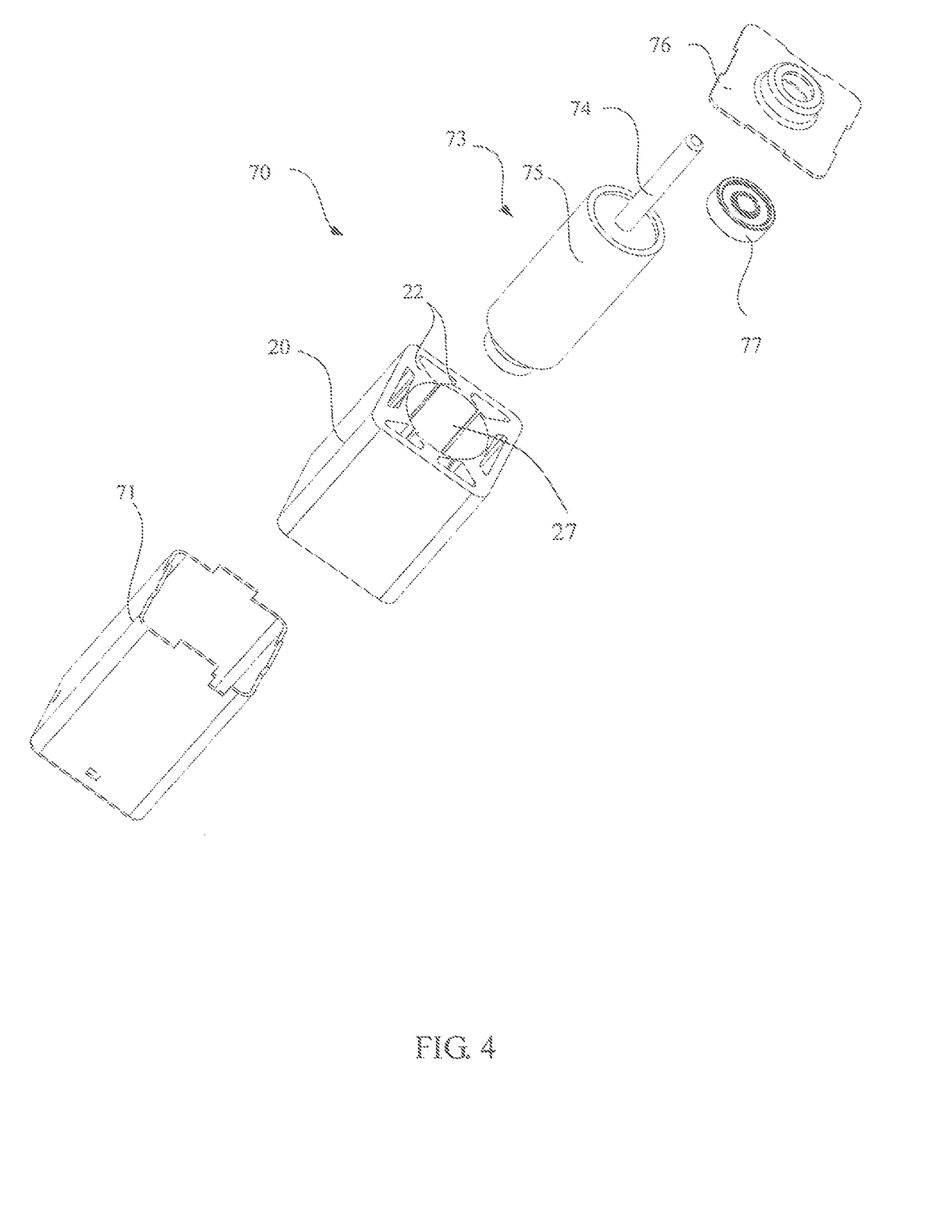
FIG. 4 is an exploded view of a motor incorporating the stator core of FIG. 2.

A first embodiment is illustrated in FIGS. 2 to 4. FIG. 2 illustrates a stator core according to a first preferred embodiment of the present invention. FIG. 3 illustrates a stator core lamination. In the present embodiment, the stator core 20 is formed by stacking a plurality of stator core laminations 2 of FIG. 3 in an axial direction of the motor. The stator core lamination 2 is made of a magnetically conductive material, such as silicon steel sheet. A plurality of teeth 22 is formed along an inner circumferential surface of the stator core lamination 2. A winding slot is formed between adjacent teeth 22. A tip 26 is formed at a distal end of each tooth 22, which extends in a circumferential direction. The tips 26 form pole heads having an inner surface known as a pole face. Inner surfaces of all the tips 26 cooperatively define a center hole 27, in which a rotor is received.

The stator core lamination of the present invention has a polygon shape, which facilitates increasing the size of the stator core lamination in limited space. In the present embodiment, the stator core lamination 2 is a quadrilateral, in particular, a square in shape, which includes four straight yoke portions 21 and six teeth 22. Adjacent yoke portions 21 are interconnected by a connecting portion 25. The winding slots can be divided into multiple groups. In the present embodiment, the winding slots are divided into two groups, namely a first group of winding slots and a second group of winding slots.

Each group of winding slots has multiple winding slots with the same shape and area. Specifically, the first group of winding slots include multiple first winding slots 23, and the second group of winding slots include multiple second winding slots 24. In this example, there are two first winding slots and four second winding slots arranged in pairs. The first group of winding slots and the second group of winding slots are circumferentially distributed. Here, a first winding slot 23 and a pair of two second winding slots 24 are alternately arranged, with each first winding slot 23 corresponding to one yoke portion 21 and the pair of second winding slots 24 corresponding to another yoke portion 21.

The two groups of winding slots 23, 24 have different shapes. However, the ratio of the area of any first winding slot to the area of any second winding slot is greater than or equal to 0.9 but less than or equal to 1.1. As shown in FIG. 2, the winding slot 23 is elongate in shape, and the winding slot 24 is triangular in shape. The shape of the winding slots may vary according to the particular shape of the stator core 20. With the winding slots having different shapes, the space for the winding can be fully utilized. In addition, that all the winding slots have approximately the same area can ensure a uniform winding. Preferably, the connecting portion 25 is arcuate in shape to facilitate production.

As shown in FIG. 4, the stator core 20 is incorporated into a corresponding electric motor 70. The motor illustrated is a four-pole, six-slot motor. The motor 70 includes a housing 71, a stator core 20, a rotor 73, and an end cap 76. The stator core 20 is fixedly received in the housing 71. The rotor 73 is inserted into the center hole 27 of the stator core 20. The end cap 76 is fixed to the housing 71. A shaft 74 of the rotor 73 is supported by a bearing 77 mounted to the end cap and another bearing mounted to the housing, such that the rotor 73 can rotate with respect to the stator core. The teeth 22 of the stator core 20 surround magnetic poles 75 of the rotor formed by one or more permanent magnets.

Figure 5:
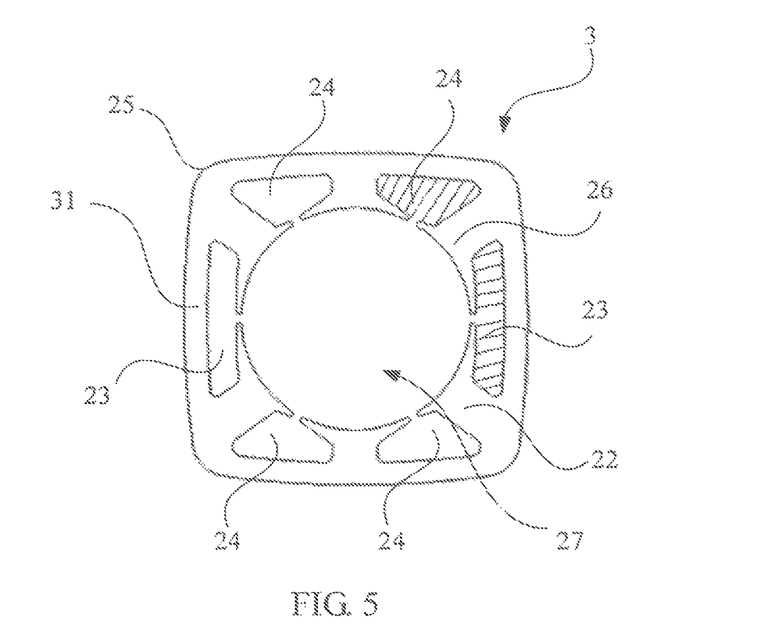
FIG. 5 illustrates a stator core lamination according to a second embodiment.

A second embodiment is shown in FIG. 5. The configuration of the second embodiment is substantially the same as that of the first embodiment, except that: as shown in FIG. 5, each yoke portion 31 of the stator core lamination 3 is arc-shaped. Specifically, a middle of the yoke portion protrudes outwardly with respect to opposite ends of the yoke portion. This shape can further increase the space available for winding thus increasing the area of the winding slot.

Figure 6:
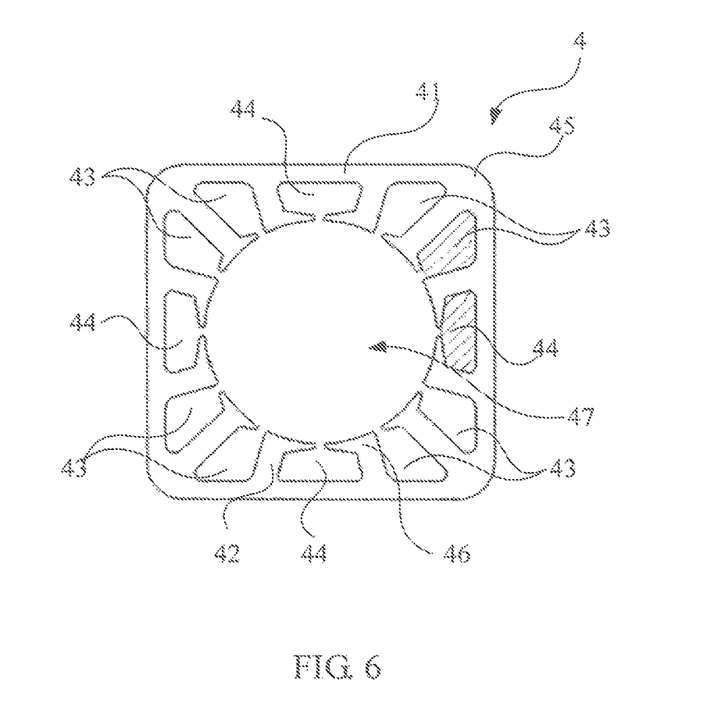
FIG. 6 illustrates a stator core lamination according to a third embodiment.
Figure 7:
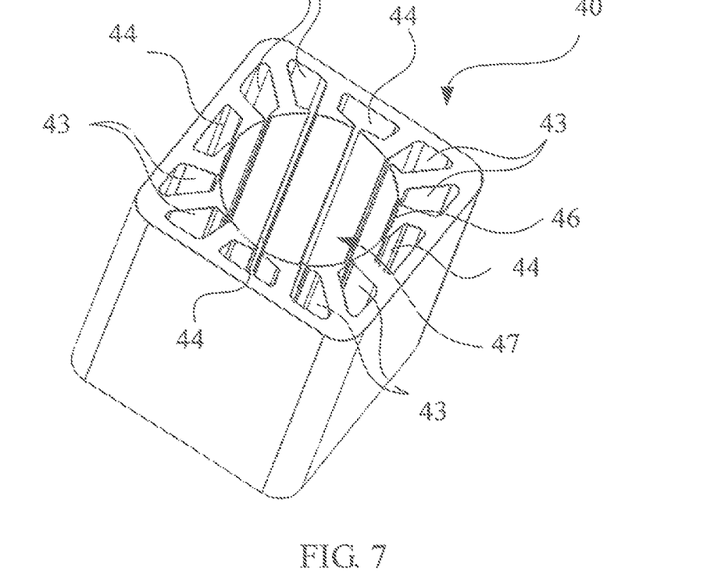
FIG. 7 illustrates a stator core formed by stator core laminations according to FIG. 6.

A third embodiment is shown in FIGS. 6 and 7. FIG. 6 illustrates another square stator core lamination 4, and FIG. 7 illustrates a stator core 40 according to the present embodiment. In the present embodiment, the stator core 40 is formed by stacking a plurality of stator core laminations 4 according to FIG. 6. A plurality of teeth 42 is formed along an inner circumferential surface of the stator core lamination 4. A winding slot is formed between every two adjacent teeth 42. A tip 46 is formed at a distal end of each tooth 42, which extends in a circumferential direction. Inner surfaces of all the tips 46 cooperatively define a center hole 47.

In the present embodiment, the stator core lamination 4 is a quadrilateral, in particular, square in shape, which includes four straight yoke portions 41 and twelve teeth 42. Adjacent yoke portions 41 are interconnected by connecting portion 45. The winding slots can be divided into multiple groups. In the present embodiment, the winding slots are divided into two groups including a first group of winding slots and a second group of winding slots. Each group of winding slots include multiple winding slots with the same shape. Specifically, the first group of winding slots include multiple first winding slots 43, and the second group of winding slots include multiple second winding slots 44.

The first group of winding slots and the second group of winding slots are circumferentially distributed. Here there are eight first winding slots arranged in pairs and four second winding slots. A pair of first winding slots 43 and one second winding slot 44 are alternately arranged, with two first winding slot 43 and one second winding slot 44 corresponding to one yoke portion 41. In particular, the first and second winding slots 43, 44 have different shapes, and the ratio of the area of any first winding slot 43 to the area of any second winding slot 44 is greater than or equal to 0.9 but less than or equal to 1.1. As shown in FIG. 6, the winding slot 43 of the first group is a polygon in shape, and the winding slot 44 of the second group is a trapezoid in shape. The shape of the winding slots may vary according to the particular shape of the stator core 4. With the winding slots having different shapes, the space for winding can be fully utilized. In addition, that all the winding slots have approximately the same area can ensure a uniform winding. Preferably, the connecting portion 45 is arcuate in shape for facilitating production.

Figure 8:
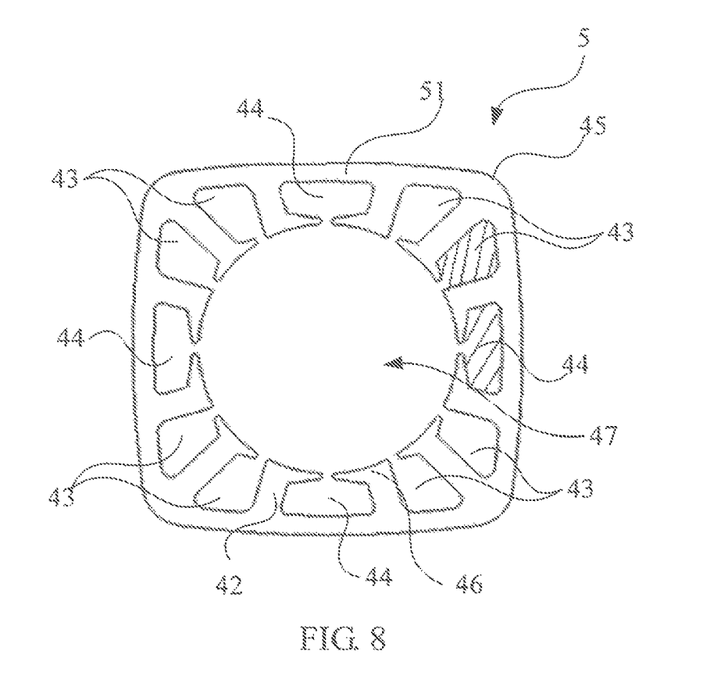
FIG. 8 illustrates a stator core lamination according to a fourth embodiment.

A fourth embodiment is shown in FIG. 8. The configuration of the fourth embodiment is substantially the same as that of the third embodiment, except that: as shown in FIG. 8, each yoke portion 51 of the stator core lamination 5 is arc-shaped. Specifically, a middle of the yoke portion protrudes outwardly with respect to opposite ends of the yoke portion. This shape can further increase the space available for winding thus increasing the area of the winding slot.

Figure 9:
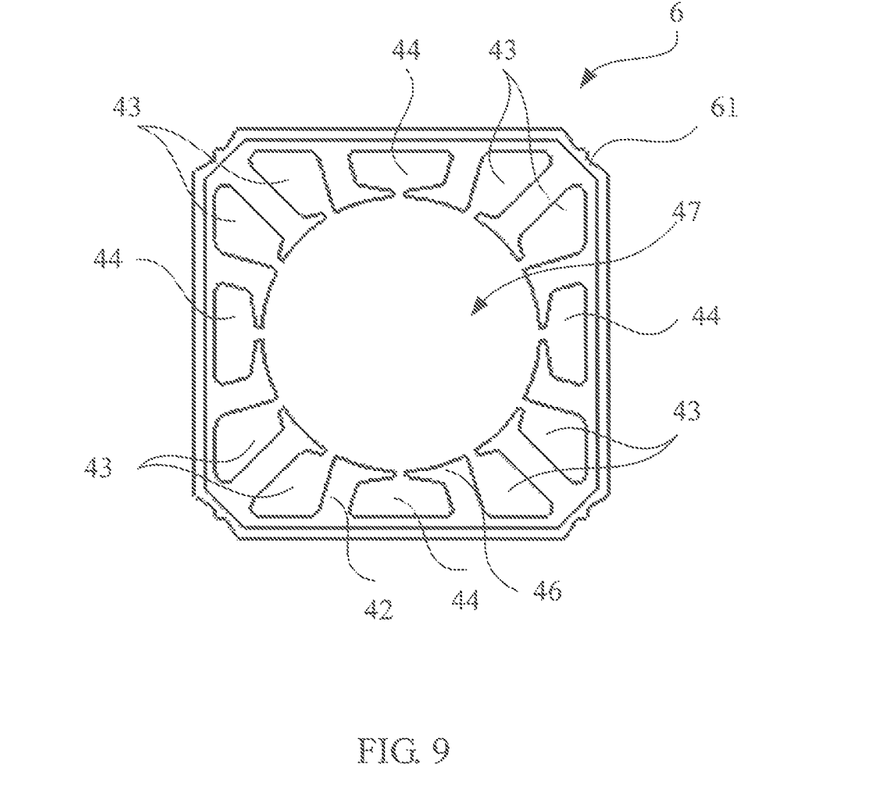
FIG. 9 illustrates a stator core lamination according to a fifth embodiment.
Figure 10:
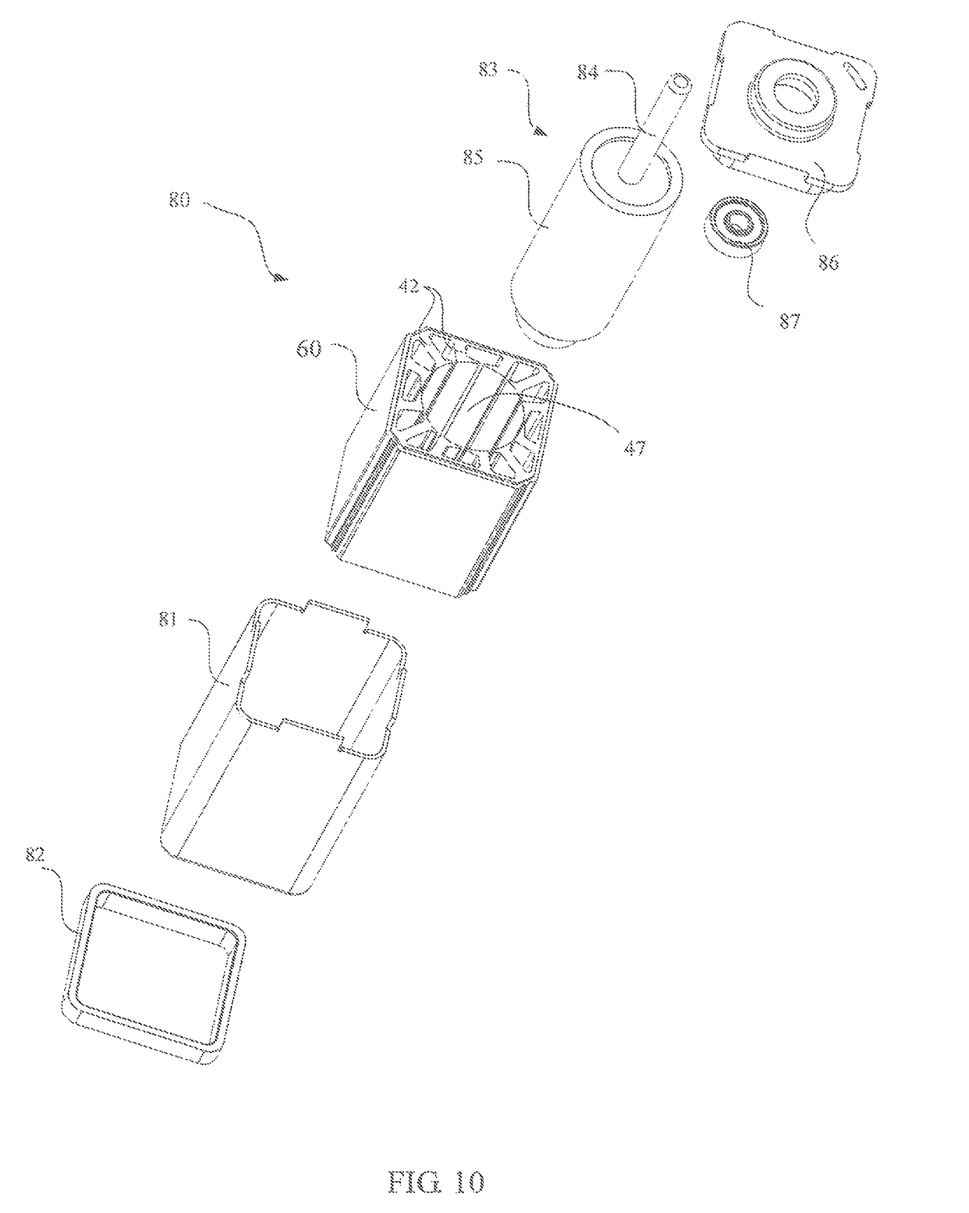
FIG. 10 is an exploded view of a motor incorporating a stator core formed by stator core laminations according to FIG. 9.

A fifth embodiment is shown in FIGS. 9 & 10. The configuration of the fifth embodiment is substantially the same as that of the third embodiment, except that: as shown in FIG. 9, the connecting portion 61 of the stator core lamination 6 has a kinked shape. This shape enables the stator core to be engagingly received in the housing 81 (FIG. 10) to achieve a more solid assembly. It should be understood that the connecting portion may also have another shape such as a straight line.

As shown in FIG. 10, the stator core 60 is assembled to form a corresponding motor 80. The motor illustrated is an eight-pole twelve-slot motor in the present embodiment. The motor 80 includes the housing 81, a fixing part 82, a stator core 60, a rotor 83, and an end cap 86. The stator core 60 is fixedly received in the housing 81. The fixing part 82 fixes the stator core 60 from one end of the housing 81. The rotor 83 is inserted into the center hole 47 of the stator core 60. The end cap 86 is fixed to the housing 81. A shaft 84 of the rotor 83 is supported by a bearing 87 mounted to the end cap 86 and by another bearing fitted to the housing 81, such that the rotor 83 can rotate with respect to the stator core 60. The teeth 42 of the stator core 60 surround magnetic poles 85 of the rotor formed by one or more permanent magnets.

In comparison with an eight-pole twelve-slot motor made of traditional stator core laminations, the eight-pole twelve-slot motor of the present embodiment has an output power increased by 40%.

It should be understood that the stator core lamination of the present invention may also have another polygon shape such as hexagon. The number of the winding slots may be an integral multiple of three, and the shape of the winding slots may be a polygon such as rhombus or an irregular shape. The number of magnetic poles of the rotor is an integral multiple of two.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to preferred embodiments, it should be appreciated by those skilled in the art that various modifications are possible. For example, instead of forming the stator core by stacking a plurality of the stator core laminations as described above, the stator core may also be formed by powder sintering. Therefore, the scope of the invention is to be determined by reference to the claims that follow.

The invention claimed is:

1. An electric motor comprising a stator having a polygon stator core and a rotor rotatable relative to the stator and having a plurality of magnetic poles,
   wherein the polygon stator core comprises:
   a plurality of yoke portions and connecting portions interconnecting adjacent yoke portions to form a polygon, adjacent yoke portions having a same shape and size;
   a plurality of teeth extending inwardly from the yoke portions, adjacent teeth having different shapes and sizes,
   winding slots respectively formed between adjacent teeth, the winding slots comprising a plurality of first winding slots and a plurality of second winding slots, the first winding slots and the second winding slots have different shapes, and the ratio of the area of one of the first winding slots to the area of one of the second winding slots is greater than or equal to 0.9 but less than or equal to 1.1;
   wherein two of the second winding slots circumferentially adjacent to each other are disposed between opposite first winding slots, each of said opposite first winding slot is disposed between a pair of said circumferentially adjacent second winding slots.

2. The motor of claim 1, wherein the yoke portions of the stator core are connected to form one of a quadrilateral, a square and a hexagon.

3. The motor of claim 2, wherein each yoke portion of the stator core is straight.

4. The motor of claim 2, wherein each yoke portion of the stator core is arc-shaped.

5. The motor of claim 2, wherein the number of the winding slots is an integral multiple of three.

6. The motor of claim 2, wherein the shape of the winding slot is one of a triangle, rectangle, rhombus and trapezoid.

7. The motor of claim 1, wherein the connecting portion is one of arcuate, straight and kinked in shape.

8. The motor of claim 1, wherein the yoke portions of the stator core are connected to form a quadrilateral, and six or twelve teeth are formed along an inner circumferential surface of the stator core.

9. The motor of claim 1, wherein the plurality of the first winding slots have a first shape, and the plurality of the second winding slots have a second shape, different from the first shape.

10. The motor of claim 1, wherein the ratio of the number of the magnetic poles to the number of the teeth is 2:3.

* * * * *